(12) United States Patent
Glasmachers

(10) Patent No.: US 11,062,027 B2
(45) Date of Patent: Jul. 13, 2021

(54) SYSTEM WITH AN ELECTRICAL APPARATUS

(71) Applicant: KROHNE Messtechnik GmbH, Duisburg (DE)

(72) Inventor: Holger Glasmachers, Bochum (DE)

(73) Assignee: KROHNE Messtechnik GmbH, Duisburg (DE)

(*) Notice: Subject to any disclaimer, the term of this patent is extended or adjusted under 35 U.S.C. 154(b) by 366 days.

(21) Appl. No.: 16/247,071

(22) Filed: Jan. 14, 2019

(65) Prior Publication Data
US 2019/0220598 A1    Jul. 18, 2019

(30) Foreign Application Priority Data

Jan. 12, 2018  (DE) .......................... 102018100629.2

(51) Int. Cl.
*G06F 21/55* (2013.01)
*G06F 21/56* (2013.01)
(Continued)

(52) U.S. Cl.
CPC .......... *G06F 21/566* (2013.01); *G06F 21/554* (2013.01); *H04L 63/0209* (2013.01); *H04L 63/1425* (2013.01); *H04L 63/1441* (2013.01); *H04L 67/12* (2013.01); *H04W 12/122* (2021.01); *G06F 2221/034* (2013.01)

(58) Field of Classification Search
CPC .......... G06F 21/30; G06F 21/44; G06F 21/51; G06F 21/57; G06F 21/572; G06F 21/72; G06F 21/75; G06F 21/86; G06F 21/87; H04L 21/0643; H04L 21/0897; H04L 21/3236; H04L 21/3247; H04L 21/127; G05F 12/14; G05F 12/1425
See application file for complete search history.

(56) References Cited

U.S. PATENT DOCUMENTS 9,578,763 B1 * 2/2017 Wade ....................... G06F 21/86
9,602,508 B1 * 3/2017 Mahaffey ............. H04W 12/084
(Continued)

FOREIGN PATENT DOCUMENTS

DE    102013221164 A1    5/2015
DE    102016103521 A1    9/2016
(Continued)

*Primary Examiner* — Eric W Shepperd
(74) *Attorney, Agent, or Firm* — Whitmyer IP Group LLC

(57) ABSTRACT

A system includes an electrical apparatus and a connecting device. The electrical apparatus comprises a control unit, a first interface device and a second interface device. A wire-bound first communication path is provided between the control unit and the connecting device via the first interface device and a second communication path is provided between the control unit and the second interface device. The system further includes a coupling device that can be set into a first coupling state and into a second coupling state. The first communication path is led through the coupling device in the first coupling state and is interrupted in the coupling device in the second coupling state. The control unit detects an attack on the system via the second interface device and, in the event of a detected attack, sets the coupling device from the first coupling state into the second coupling state.

13 Claims, 2 Drawing Sheets

(51) Int. Cl.
*H04L 29/06* (2006.01)
*H04L 29/08* (2006.01)
*H04W 12/122* (2021.01)

(56) References Cited

U.S. PATENT DOCUMENTS

| | | | |
|---|---|---|---|
| 10,291,506 B2 | 5/2019 | Mixer et al. | |
| 2004/0083408 A1* | 4/2004 | Spiegel | G06F 21/566 |
| | | | 714/43 |
| 2004/0162992 A1* | 8/2004 | Sami | H04L 61/20 |
| | | | 726/13 |
| 2007/0162974 A1* | 7/2007 | Speidel | H04L 63/1425 |
| | | | 726/22 |
| 2010/0088766 A1* | 4/2010 | Michaely | H04L 63/1466 |
| | | | 726/23 |
| 2014/0196159 A1* | 7/2014 | Mangalam-Palli | |
| | | | H04N 21/4405 |
| | | | 726/30 |
| 2014/0359097 A1* | 12/2014 | Parks | H04L 47/10 |
| | | | 709/223 |
| 2017/0147039 A1* | 5/2017 | Peana | G06F 1/1656 |
| 2017/0317982 A1 | 11/2017 | Glasmachers | |
| 2018/0082556 A1* | 3/2018 | Dragone | G06F 21/87 |

FOREIGN PATENT DOCUMENTS

| | | |
|---|---|---|
| DE | 102016104625 A1 | 9/2017 |
| EP | 1742135 A1 | 1/2007 |
| EP | 3244274 A1 | 11/2017 |

\* cited by examiner

SYSTEM WITH AN ELECTRICAL APPARATUS

TECHNICAL FIELD

The invention relates to a system with an electrical apparatus and a connecting device. The electrical apparatus comprises a control unit, a first interface device and a second interface device. A wire-bound first communication path is provided between the control unit and the connecting device via the first interface device. Consequently, the first communication path is led over the first interface device. Further, a second communication path is provided between the control unit and the second interface device.

BACKGROUND

Systems of the specified type are used, for example, in industrial systems. Industrial systems with these systems usually also use other electrical equipment, such as process control systems or computer systems, which also have interface devices. The system is therefore an electrical system. At least some of the electrical equipment, including the systems, of an industrial system are connected to a transmitting medium via interface devices and communicate with one another via this medium.

Communication is generally the transmission of information by signals via communication paths. Information includes data and instructions. Communication paths can be wire-bound and wireless. In a wire-bound communication path, signals are transmitted via a transmitting medium such as electrical conductors. In a wireless communication path, signals are transmitted via radio and therefore do not require a transmitting medium. Communication in industrial systems is usually divided into secure communication on the one hand and non-secure communication on the other. With secure communication, the transmitted information is protected against manipulation so that its integrity is guaranteed. This is not the case with non-secure communication. Secure communication uses measures to at least make it more difficult to manipulate information and, ideally, make it impossible. Accordingly, secure communication takes place via secure communication paths with interface devices for secure communication and non-secure communication takes place via non-secure communication paths with interface devices for non-secure communication. On the one hand, the operator of an industrial system and, on the other hand, the type of industrial system both contribute to what is considered secure and what is considered non-secure. A general definition is not possible.

In an industrial system, usually a system of the type described is connected via the first interface device to other electrical apparatuses of the industrial system for secure communication. Secure communication results, in particular, from the wire-bound connection of the first communication path, which also extends over the other devices, and the familiarity of the other devices. The familiarity of the other devices ensures that no unauthorized communication takes place. Unauthorized communication is communication that impairs the proper functioning of the industrial system. Furthermore, the second interface device is often used for non-secure communication, for example reading certain information from the system using a plurality of auxiliary devices. The plurality of auxiliary devices make a simple connection and disconnection of the second communication path desirable, but this also facilitates access by unauthorized and unknown auxiliary devices. Due to the possible access of unauthorized auxiliary devices to the second interface device, this communication is regarded as non-secure and the second interface device as a weak point in the industrial system.

This weak point often allows the industrial system to be compromised by an attack. It has been recognized that it is possible in systems of the type described to impair the proper functioning of the system itself and/or other electrical equipment of the industrial system via the second interface device.

SUMMARY

An object of the present invention is therefore to provide a system in which the weak point no longer exists or at least has been reduced. With such a system, the security of the system itself and also of an industrial system is improved.

In a system of the type described, the object is achieved by the teaching according to the present invention. According to the teaching, the system has a coupling device that can be set into a first coupling state and into a second coupling state. In the first coupling state, the first communication path is led through the coupling device and, in the second coupling state, the first communication path is interrupted in the coupling device. Thus, communication is possible via the first communication path in the first coupling state and communication is not possible via the first communication path in the second coupling state. The control unit is designed to detect an attack on the system via the second interface device and, in the event of a detected attack, to set the coupling device from the first coupling state into the second coupling state. Accordingly, the control unit is designed to actuate the coupling device. An attack on the system is, in particular, an attempt to carry out unauthorized communication via an interface device.

An advantage of the system according to the invention compared to systems known from the prior art is that, in the event of a detected attack, the first communication path is interrupted so that impairment is only possible to the system, but not to further electrical devices connected to the system via the first interface device.

The probability of an attack via the second interface device is greater than that of an attack via the first interface device. Usually, the electrical devices connected to the first interface device is more familiar than the auxiliary equipment connected to the second interface device. Therefore, it is initially only provided that the control unit is designed to detect an attack on the system via the second interface device. However, security can be further improved if attacks on the system via the first interface device are also detected. Therefore, it is provided in one design of the system according the invention that the control unit is also designed to detect an attack on the system via the first interface device and to set the coupling device from the first coupling state into the second coupling state if an attack is detected.

In a further design of the system, it is provided that the control unit is designed to detect an attack by storing permissible communications via the first interface device and/or via the second interface device in the control unit and by classifying communications that deviate therefrom as an attack. Non-permissible communication is, for example, an intervention in a parameterization of the system or another electrical device of an industrial system via the second interface device or write access via the second interface device.

It has been recognized that, in the event of an attack on the system, there is a possibility that the control unit is affected such that the control unit is no longer able to set the coupling device from the first coupling state into the second coupling state. In order to eliminate this vulnerability, it is provided in a further design that, when the coupling device is not actuated, the coupling device is in the second coupling state. Accordingly, the coupling device must be actively actuated by the control unit so that the coupling device is in the first coupling state. This makes the system inherently secure.

In a further design, it is provided that the coupling device is arranged between the first interface device and the connecting device. In this arrangement, the coupling device is arranged between the electrical apparatus and the connecting device. The arrangement of the coupling device between the electrical apparatus and the connecting device means that systems known from the prior art can be easily retrofitted.

In a further design, it is provided that the coupling device is separate from the control unit. Preferably, the coupling device is not only separate from the control unit, but also from the interface devices, i.e. from the electrical apparatus. In particular, an arrangement of the separate coupling device between the first interface device and the connecting device is recommended. This design is suitable due to its modularity and ability to easily retrofit systems known from the prior art. If this or the previous design is retrofitted to existing systems, the control unit is to be adapted such that it is designed to control the coupling device and to detect attacks. Usually these adaptations can be implemented by programming existing control units.

The coupling device is designed such that the first communication path is led through the coupling device in the first coupling state and is interrupted in the coupling device in the second coupling state. In a further design, it is provided that the coupling device has at least one first switch for implementing the first coupling state and the second coupling state. The first switch can be set into a first switching state and a second switching state and the control unit is designed to set the first switch. The first switching state exists in the first coupling state and the second switching state exists in the second coupling state. The first switch, for example, is designed as a single-pole switch. In this design, the first switch is then closed in the first coupling state so that it leads the first communication path through the coupling device, and open in the second coupling state so that it interrupts the first communication path in the coupling device.

In a preferred design, it is initially provided that the first interface device is designed as a loop interface. Due to this design of the loop interface, it is further provided that the connecting device is designed for connection to a transmitting medium in ring topology. The transmitting medium has a ring communication path. Furthermore, the coupling device is designed to loop the first communication path into the ring communication path in the first coupling state and to separate the first communication path from the ring communication path in the second coupling state.

Looping the first communication path into the ring communication path means that the ring communication path is split up and the first communication path is looped into the ring communication path so that the first communication path and the ring communication path together form a new ring communication path. In the second coupling state, the first communication path is separated from the ring communication path, which means that the ring communication path is separated in the coupling device. In the ring communication path of a transmitting medium in ring topology, the communication paths of several systems and/or electrical apparatuses can usually be looped in so that they can communicate with one another.

Preferably, not only communication, but also the supply of electrical power to the system is carried out via a transmitting medium that is connected to the first interface device. Thus, the system is supplied via the first interface device. The supply of the system is then interrupted in the second coupling state, which is why the system can no longer be used to continue the attack that caused the second coupling state.

In a further development of the above design, in which the coupling device has at least one first switch for implementing the first coupling state and the second coupling state, it is provided that the coupling device has at least a second switch. It is also provided that the first switch and the second switch can each be simultaneously set into a first switching state or into a second switching state. The first switching state exists in the first coupling state and the second switching state exists in the second coupling state. In the first switching state, the second switch splits up the ring communication path and the first switch loops the first communication path into the ring communication path. In the second switching state, the second switch loops the ring communication path in and the first switch separates the communication path from the ring communication path.

In a further development alternative to the further development described above, it is provided that the coupling device has, in addition to the first switch, at least a second switch and a third switch. The first switch, the second switch and the third switch can be simultaneously set into a first switching state and a second switching state. The first switching state exists in the first coupling state and the second switching state exists in the second coupling state. In the first switching state, the second switch splits up the ring communication path, on the one hand, and the first switch and the third switch loop the first communication path into the ring communication path, on the other hand. In the second switching state, the second switch loops the ring communication path in and the first switch and the third switch separate the first communication path from the ring communication path.

The two above-mentioned alternative further developments have common features. In the first coupling state, the first communication path is looped into the ring communication path and in the second coupling state, the ring communication path is looped in in the coupling device. In the alternative further development, the use of three switches instead of two in the second coupling state ensures galvanic isolation from the transmitting medium and the first interface device.

In the two above further developments, the first, second and third switches are designed, for example, as single-pole switches. In the first switching state, the first and possibly third switches are closed and, in the second switching state, they are open and the second switch is open in the first switching state and closed in the second switching state. The switches are set by the control unit, which is appropriately designed and connected to the switches of the coupling device.

If the first interface device is designed as a loop interface, it is provided that the first interface device is designed as a current loop interface. This configuration includes, for example, a design according to the 4-20 mA standard and/or according to the HART standard. The 4-20 mA standard, for example, is standardized in DIN 66258.

In a further design of the system, it is provided that the second interface device is designed as a wireless interface.

The wire-bound connection of the first communication path establishes the suitability of the first interface device for secure communication. In contrast, the design of the second interface device as a wireless interface makes it more susceptible to successful attacks on the system, which is why the second interface device is only designed for non-secure communication. However, designing the second interface device as a wireless interface enables easier access to the system, which is advantageous for certain authorized applications.

It is provided in a further design that the electrical apparatus is designed as a field device. Field devices are used, in particular, in industrial process automation systems. Process automation deals with the automation of industrial processes, such as manufacturing processes. Such processes are controlled by actuators and monitored by sensors. Actuators are, for example, control elements and valves; and sensors are, for example, flow, level, temperature, pressure, analysis, gas and steam measuring instruments. Such actuators and sensors are preferably designed as field devices, wherein field devices have an interface device, such as the first and/or second interface device, for communication.

BRIEF DESCRIPTION OF THE DRAWINGS

In detail, there is a plurality of possibilities for designing and further developing the system. Reference is made to the following description of a preferred embodiment in conjunction with the drawings.

DETAILED DESCRIPTION

Figure 1:
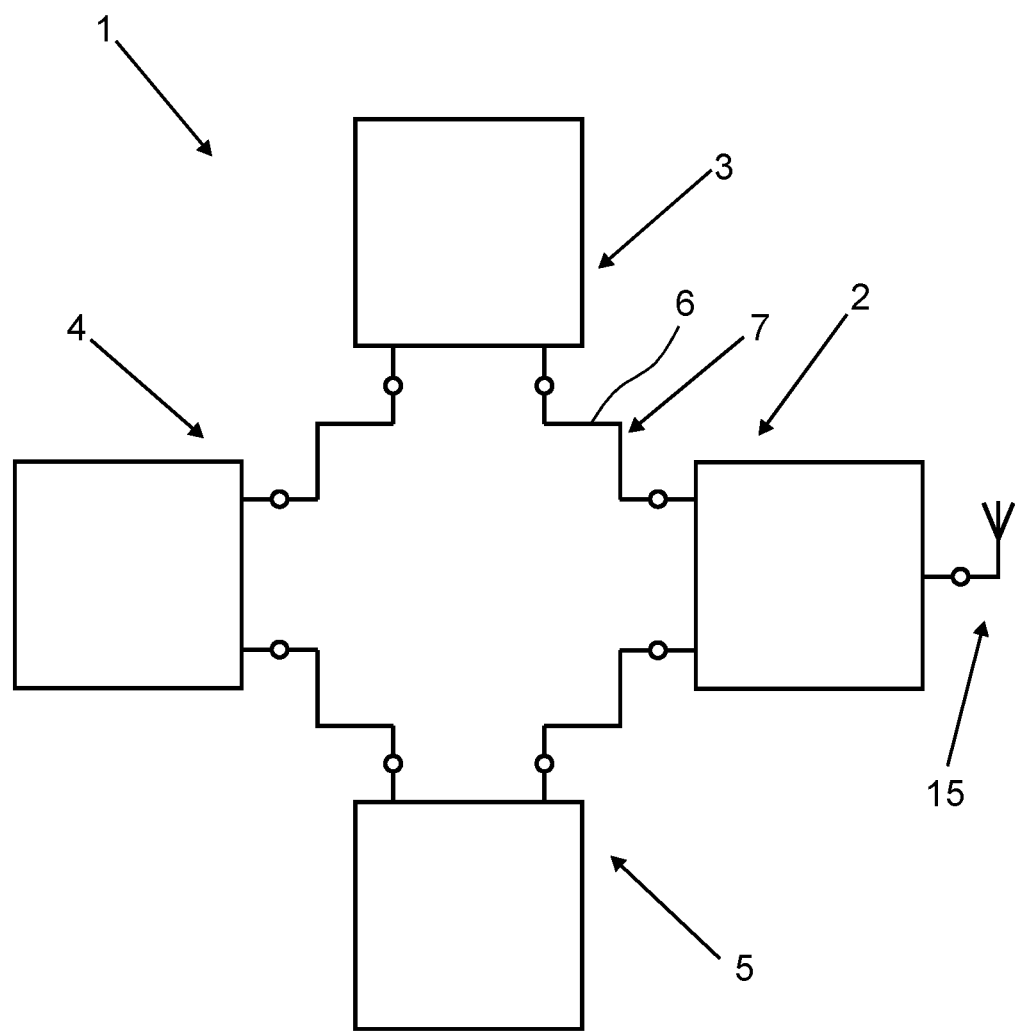
FIG. 1 provides an industrial system with a system and several pieces of equipment.

FIG. 1 shows the essential characteristics of an industrial system 1. The industrial system 1 has, in addition to an electrical system 2, other electrical devices 3, 4, 5. The other electrical devices 3, 4, 5 are, for example, process control systems or computer systems. Both the system 2 and the other electrical devices 3, 4, 5 have interface devices via which they are electrically connected to a transmitting medium 6. The transmitting medium 6 is designed in ring topology and has a ring communication path 7. The system 2 and the other electrical devices 3, 4, 5 communicate with one another via the ring communication path 7. Due to the transmitting medium 6, the ring communication path 7 is wire-bound. Due to the wire-bound connection of the ring communication path 7 and the familiarity of the system 2 and the further electrical devices 3, 4, 5, communication via the ring communication path is regarded as secure in the following.

Figure 2:
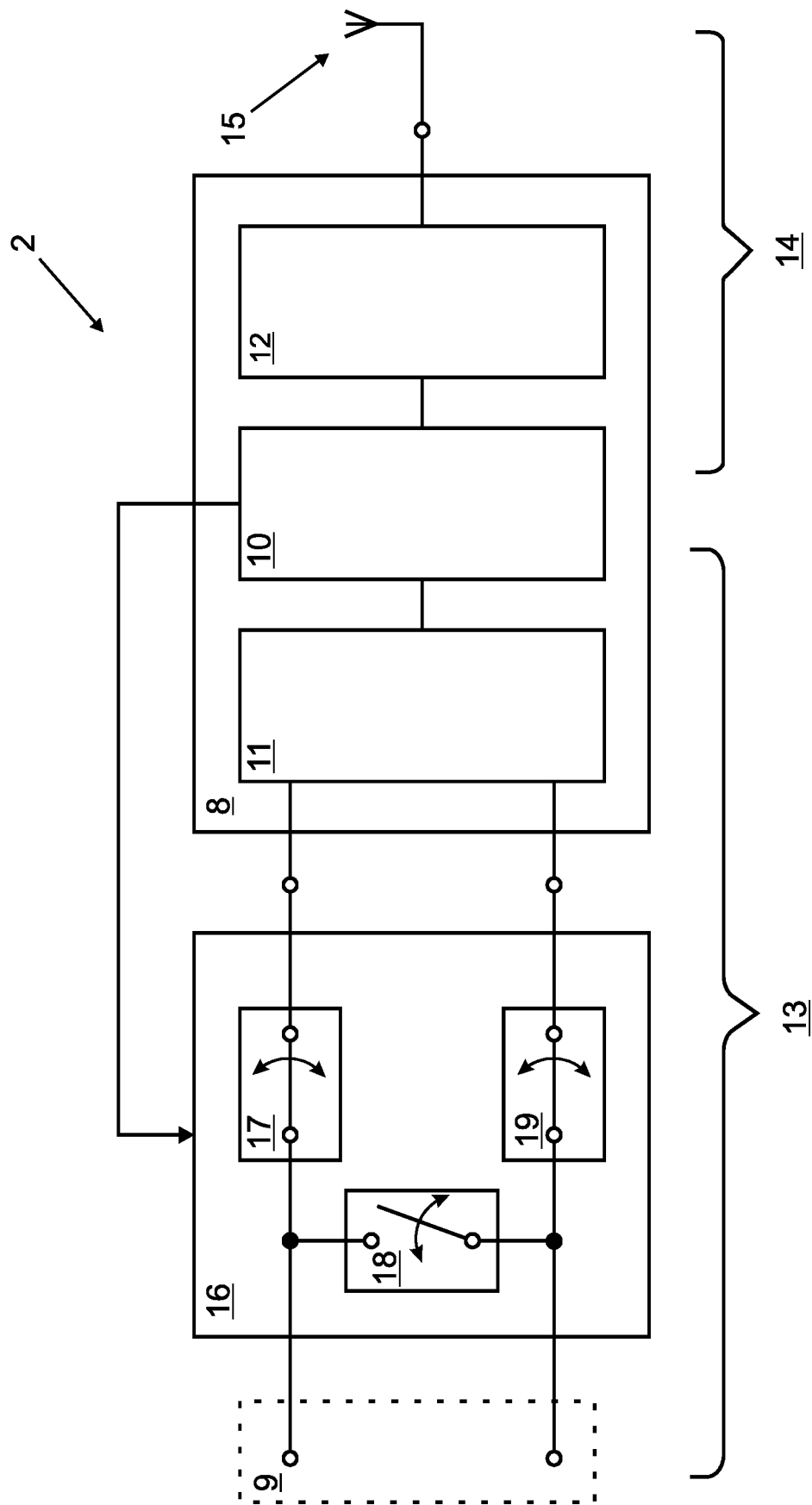
FIG. 2 illustrates the system of the industrial system.

FIG. 2 shows the essential features of the system 2. The system 2 initially has an electrical apparatus 8 and a connecting device 9. The electrical apparatus 8 in turn has a control unit 10, a first interface device 11 and a second interface device 12. There is a first wire-bound communication path 13 between the control unit 10 and the connecting device 9. The first communication path 13 is led via the first interface device 11. Thus, the first interface device 11 is located in the first communication path 13. Further, there is a second communication path 14 between the control unit 10 and the second interface device 12.

In this embodiment, the first interface device 11 is designed as a loop interface, i.e. as a current loop interface. Therefore, the first interface device 11 is also designed for connection to a transmitting medium in ring topology. The first interface device 11 implements both the 4-20 mA standard and the HART standard. Communication with the other electrical devices 3, 4, 5 is therefore carried out with electrical signals which are generated and received by the first interface device 11 in accordance with these standards. Furthermore, the electrical apparatus 8 is supplied with electrical energy via the first interface device 11 by the transmitting medium 6.

In this embodiment, the second interface device 12 is designed as a wireless interface. Therefore, the second interface device 12 is also connected to an antenna 15. Thus, the second communication path 14 extends from the control unit 10 to the antenna 15 and on to an auxiliary device. The wire-bound connection of the first communication path 13 establishes its suitability for secure communication. In contrast, the design of the second interface device 12 as a wireless interface makes it more susceptible to successful attacks on the system 2 by an unauthorized auxiliary device, which is why the second interface device 12 is only designed for non-secure communication. However, this disadvantage is condoned because the wireless interface allows easy access to the system 2, which is advantageous for certain permitted communication.

The system 2 also has a coupling device 16. The coupling device 16 is separate from both the connecting device 9 and the electrical apparatus 8 and is located between the first interface device 11 and the connecting device 9. The system 2 has a modular design due to the separate coupling device 16.

The coupling device 16 has a first switch 17, a second switch 18 and a third switch 19. The switches 17, 18, 19 are designed as single-pole switches. The control unit 10 is designed to simultaneously set the switches 17, 18, 19 into either a first switching state or a second switching state. In the first switching state, the first switch 17 and the third switch 19 are closed and, in the second switching state, they are open. The second switch 18 is open in the first switching state and closed in the second switching state. Furthermore, the switches 17, 18, 19 are designed such that the first switch 17 and the third switch 19 are open and the second switch 18 is closed if they are not actuated.

The coupling device 16 can be set to a first coupling state and to a second coupling state by the switches 17, 18, 19. In the first coupling state, the switches 17, 18, 19 exist in the first switching state and, in the second coupling state, they exist in the second switching state. In the first coupling state, the second switch 18 splits up the ring communication path 7, on the one hand, and the first switch 17 and the third switch 19 loop the first communication path 13 into the ring communication path 7, on the other hand. Thus, the first communication path 13 is implemented by the coupling means 16, wherein the first communication path 13 is looped into the ring communication path 7. FIG. 2 shows the first coupling state. In the second coupling state, the second switch 18 loops the ring communication path 7 in, on the one hand, and the first switch 17 and the third switch 19 separate the first communication path 13 from the ring communication path 7, on the other hand. Thus the ring communication path 7 is looped in in the coupling device 16 and the first communication path 13 is interrupted in the coupling device 16. The first communication path 13 is interrupted in such a manner that the electrical apparatus 8 is electrically isolated from the transmitting medium 6 and supply of the electrical apparatus 8 is also interrupted. Thus the coupling device 16 is designed to loop the first communication path 13 into the ring communication path 7 in the first coupling state and to separate the first communication path 13 from the ring communication path 7 in the second coupling state.

The control unit 10 is designed, on the one hand, to detect an attack on the system 2 via the second interface device 12 and, on the other hand, to actuate the coupling device 16. In this embodiment, the control unit 10 is designed to detect an attack on the system 2 by storing permissible communications via the second interface device 12 in the control unit 10 and by classifying different communications as an attack. The control unit 10 is designed to actuate the coupling device 16 in that the control unit 10 sets the coupling device 16 from the first coupling state into the second coupling state when an attack is detected.

The system 2 ensures that, in the event of a successful attack via the second interface device 12, the proper functioning of the other devices 3, 4, 5 is not impaired. On the one hand, access to the ring communication path 7 via the second interface device 12 is not possible during the attack. On the other hand, the ring communication path 7 is not interrupted, so that the other devices 3, 4, 5 can continue to communicate.

Another embodiment differs from the previous embodiment only in that the third switch 19 is replaced by a short circuit. Thus, the third switch 19 is missing. Consequently, there is no galvanic isolation between the transmitting medium 6 and the electrical apparatus 8 in the second coupling state. Otherwise, the explanations relating to the above embodiments apply accordingly.

The invention claimed is:

1. A system, comprising:
   an electrical apparatus; and
   a connecting device;
   wherein the electrical apparatus comprises a control unit, a first interface device and a second interface device;
   wherein a wire-bound first communication path is provided between the control unit and the connecting device via the first interface device and a second communication path is provided between the control unit and the second interface device;
   wherein the system has further comprises a coupling device;
   wherein the coupling device can be set into a first coupling state and into a second coupling state;
   wherein the first communication path is led through the coupling device in the first coupling state and is interrupted in the coupling device in the second coupling state; and
   wherein the control unit is designed to detect an attack on the system via the second interface device and, in the event of a detected attack, to set the coupling device from the first coupling state into the second coupling state.

2. The system according to claim 1, wherein the control unit is designed to detect an attack on the system via the first interface device and, in the event of a detected attack, to set the coupling device from the first coupling state into the second coupling state.

3. The system according to claim 1, wherein the control unit is designed for detecting an attack, in that permissible communications via the first interface device and/or via the second interface device is or are stored in the control unit, and in that communications deviating therefrom are classified as an attack.

4. The system according to claim 1, wherein, if the coupling device is not actuated, the coupling device is in the second coupling state.

5. The system according to claim 1, wherein the coupling device is arranged between the first interface device and the connecting device.

6. The system according to claim 1, wherein the coupling device is separate from the control unit.

7. The system according to claim 1, wherein the coupling device comprises at least one first switch for implementing the first coupling state and the second coupling state.

8. The system according to claim 7,
   wherein the first interface device is designed as a loop interface;
   wherein the connecting device is designed to be connected to a transmitting medium in ring topology with a ring communication path;
   wherein the coupling device is designed: (i) to loop the first communication path into the ring communication path in the first coupling state, and (ii) to separate the first communication path from the ring communication path in the second coupling state.

9. The system according to claim 8, wherein the coupling device has at least a second switch;
   wherein the first switch and the second switch can each be simultaneously set into a first switching state or a second switching state;
   wherein the first switching state exists in the first coupling state and the second switching state exists in the second coupling state;
   wherein, in the first switching state, the second switch splits up the ring communication path and the first switch loops the first communication path into the ring communication path; and
   wherein, in the second switching state, the second switch loops the ring communication path in and the first switch separates the first communication path from the ring communication path.

10. The system according claim 8, wherein the coupling device comprises at least a second switch and a third switch;
    wherein the first switch, the second switch and the third switch can each be simultaneously set into a first switching state or a second switching state;
    wherein the first switching state exists in the first coupling state and the second switching state exists in the second coupling state;
    wherein, in the first switching state, the second switch loops the ring communication path in, and the first switch and the third switch loop the first communication path into the ring communication path; and
    wherein, in the second switching state, the second switch loops the ring communication path in, and the first switch and the third switch separate the first communication path from the ring communication path.

11. The system according to claim 8, wherein the first interface device is designed as a current loop interface.

12. The system according to claim 1, wherein the second interface device is designed as a wireless interface.

13. The system according to claim 1, wherein the electrical apparatus is designed as a field device.

* * * * *